Figure 1:
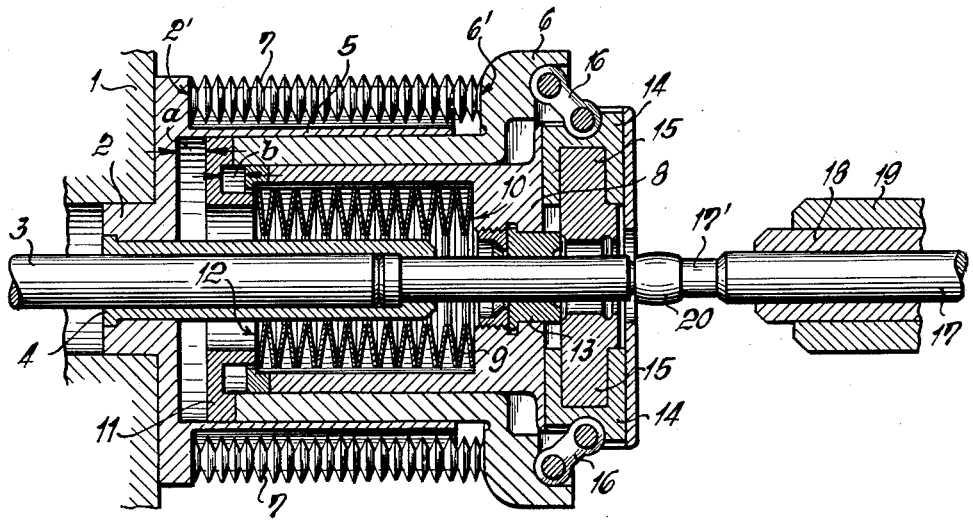

INVENTOR

Fritz Bernhard Hatebur

Feb. 11, 1964 — F. B. HATEBUR — 3,120,769
PRESSING DEVICE FOR COLD FORMING OR HOT FORMING WORKPIECES
Filed July 31, 1961 — 5 Sheets-Sheet 2

INVENTOR
Fritz Bernhard Hatebur

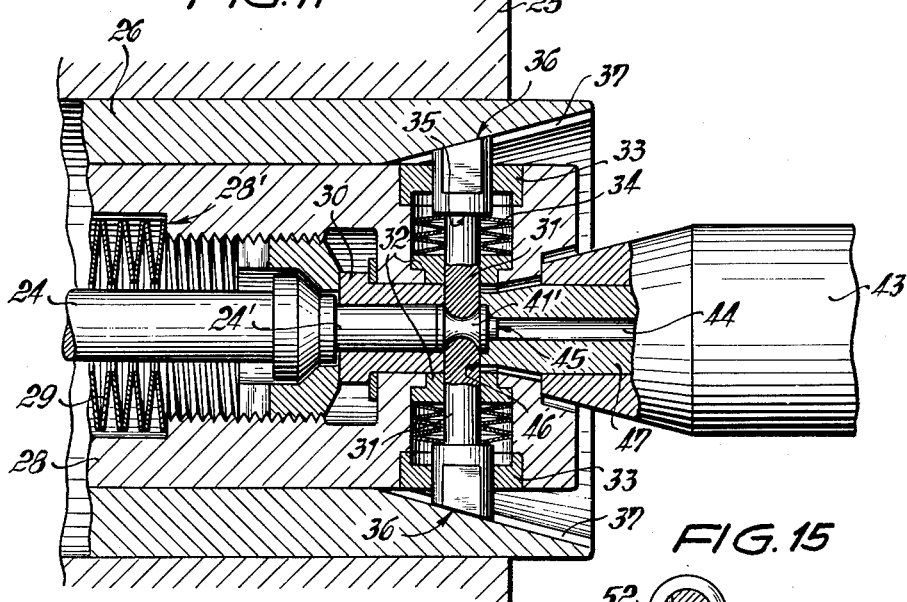

United States Patent Office 3,120,769
Patented Feb. 11, 1964

3,120,769
PRESSING DEVICE FOR COLD FORMING OR HOT FORMING WORKPIECES
Fritz Bernhard Hatebur, Spiegelgasse 4, Basel, Switzerland
Filed July 31, 1961, Ser. No. 128,049
Claims priority, application Germany Aug. 29, 1960
12 Claims. (Cl. 78—17)

The invention relates to a new or improved pressing device for cold forming or hot forming workpieces having a varying cross section along their length in the direction of operation of a press ram.

In the case of conventional methods of cold forming or hot forming workpieces which are provided, for example, with radially projecting flanges or radially re-entrant recesses, annular grooves or the like or exhibit other inwardly constricted surface portions, forming of the blank into the shape of the workpiece is effected essentially with press jaws which attack it radially and which close after the blank has been introduced into the die cavity. This mode of operation is used for example in the case of mechanical forges. The known method referred to exhibits the disadvantage that where there are discrepancies in the quantity of material in the blanks, heavy burrs may occur on the finished pieces in the region of the parting lines of the die jaws, because the latter are closed only after the blank has been introduced into the region of the jaws. It is, moreover, difficult to make the pressing efforts operate radially. On the other hand, it is more favourable if the principal forming efforts operate only axially and their transverse components produce the radial forming. A further point is that the type of press which is more particularly suited for automatic operation is that in which the blank is inserted axially into the die. The blank is then subjected to press rams operating axially and is removed—again axially—after forming.

As has already been mentioned, two-part and multiple-part dies are used more particularly in mechanical forges wherein closure of the die jaws exerts a one-sided lateral pressure upon the workpiece. Dies are also known in which the blank assumes a position in the centre of the die and where the pressure operates radially from two sides or from all round.

In addition to the above, friction presses are known having divided dies which are accommodated in a closed ring, while the divided half-dies are externally conical in construction. In this case, the press rams operate in the axial direction of the die. In order to lift out the formed workpiece, the half-dies are lifted out of the ring together with the workpiece and after being released by the ring tilt laterally so that the workpiece is freed and can be removed, in case the workpieces in question have been given projecting portions which would render axial release from the die without radial removal of the half-dies an impossibility.

It is the aim of the invention to develop a pressing method for cold forming or hot forming workpieces having a varying cross section over their length in the direction of operation of the press rams, from cut lengths of bar or prepressed blanks. The method is intended to be applied more particularly in the use of automatic cross transport presses and to serve for forming fitting bushes, chaplets or the like. The method is also intended to be capable of application where cross transport presses with a plurality of work stations are available, wherein the blank first undergoes preforming or the pressed piece is thereafter subjected to a further machining operation. It is moreover an aim of the invention to develop a device for performing the pressing method, which is intended to be capable of use for example in a known automatic cross transport press.

In order to achieve its aim, the invention provides that the blank is pushed axially into a solidly closed die of corresponding cross section to the blank, is then pressed between the back ram and the press ram into a second die located immediately axially in front of or behind the first die and composed of at least two radially movable die jaws—the die jaws being closed—and the formed workpiece is then moved out of the dies after radial opening of the die jaws.

When the method according to the invention is applied, and such known steps of the method are included as are provided, for example, in the case of cross transport presses, the following principle of operation is obtained:

First of all a piece of specific length is sheared off laterally from a bar—which may have been heated, for example by means of a medium-frequency heating apparatus—and is then pressed into a cake or provided with a thickened end by pressing, in case the subsequent finished form so requires, whereupon the blank exists which is intended to be further formed by application of the method according to the invention. The said blank is then fed by cross transport to the second press device which is constructed appropriately for performing the method.

The device for performing the pressing method according to the invention includes a die support which is movable relative to the back ram, embraces a solidly closed die and accommodates a die consisting of at least two radially movable guide jaws and located directly axially in front of or behind the solidly closed die, in which the blank can be pressed into the shape of the workpiece by means of the press ram and back ram which operate axially against one another.

The device may further include a stationary back ram with respect to which the die support, embracing the solidly closed die and accommodating the die composed of die jaws, is axially displaceable in the direction of operation of the press ram.

According to a further feature of the invention, the die carrier may be displaceable by the press ram counter to spring power in the direction of operation of the press ram, so that only the press ram need be driven and the die carrier is also moved in the direction of operation by the same, whereas it returns to the original position by the spring power.

In further elaboration of the device according to the invention, the die carrier may be guided in an axially displaceable manner in a carrier sleeve which is in turn axially displaceable in the anvil body of the device, while the displacement of the carrier sleeve and that of the die may be effected by the press ram. It is obviously also possible to perform the movements of the individual parts by particular drive, while their movements must be appropriately synchronised with one another.

In a preferred embodiment according to the invention it is provided that the axial displacement of the die support and support sleeve in the direction of operation of the press ram is controlled in such a manner that the press ram first displaces the die support alone until the die, composed of die jaws, has been closed and that the die support, support sleeve and press ram are thereafter displaced in common towards the stationary back ram with forming of the blank in the closed die.

Further according to the invention, the displacement of the die support may be effected by the press ram counter to spring power which is less than the spring power counter to which the common displacement of the die support and the support sleeve can be performed, so that in the first place the die support is displaced alone when the press ram attacks it during its movement in the direction of operation. In this case it may further be provided that the die jaws automatically close radially during the movement of the die support in the direction of operation of the press ram and automatically open radially in the case of the movement in the opposite direction. The result of this is that the blank may first of all without obstruction assume its initial position from which pressing of the same is effected in the die which closes by radial movement of its jaws after the blank has been inserted into the solidly closed die.

According to the invention it may be provided for the purpose of closing and opening the die which is composed of individual jaws, that the die jaws are articulated to the die support sleeve with interposition of elbow levers and are radially guided in the die support in such a manner that the die jaws automatically close during movement of the support in one direction, are locked during the pressing operation and automatically open during movement in the other direction. According to the invention, provision may be made in a different manner for the die jaws to be supported in the die support against sliding faces or cams of the die support sleeves which are inclined with respect to the die axis in the direction of operation of the press ram, in such a manner that the die jaws close during movement of the die support in one direction, are locked during the pressing operation and automatically open during movement in the other direction.

The radial closure of the die jaws may be effected counter to spring power, so that opening occurs automatically by the spring power.

If the device in question is required for manufacturing at least partially hollow workpieces, the press ram may be constructed in known manner as a punch with stripper which, after forming of the workpiece and radial opening of the die jaws, withdraws the workpiece while the stripper strips the workpiece from the punch.

Releasing of the finished workpiece from the solidly closed die or from the back ram or press ram may also be brought about by other measures, for example in that one of the parts which move relative to one another when the device opens engages on a shoulder of the finished piece and by its movement separates the latter from the other parts. The press ram may, moreover, enclose a further solidly closed die, as is described in detail hereinafter.

A device for manufacturing workpieces of varying workpiece cross sections may further be constructed so that the closing and opening of the die jaws is chronologically adjustable in accordance with the shape of the workpiece. In this case it may be provided that the closing and opening of the die jaws is chronologically differential—i.e., one jaw moves earlier than the other one.

Figure 4:
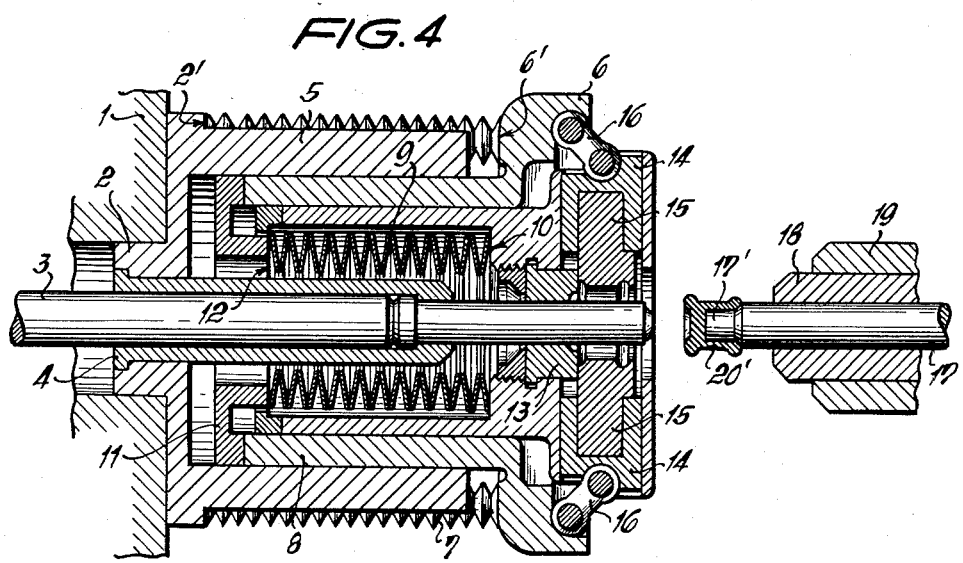
Figure 5:
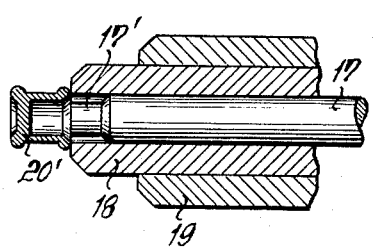
Figure 6:
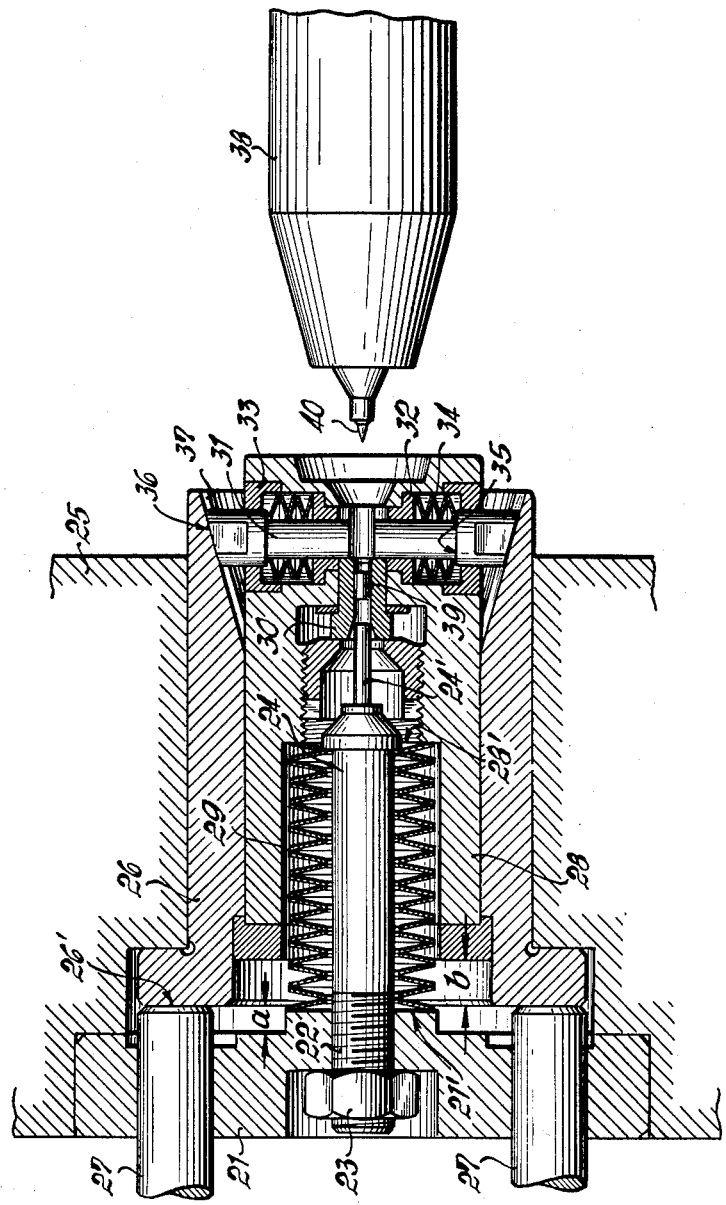
Figure 7:
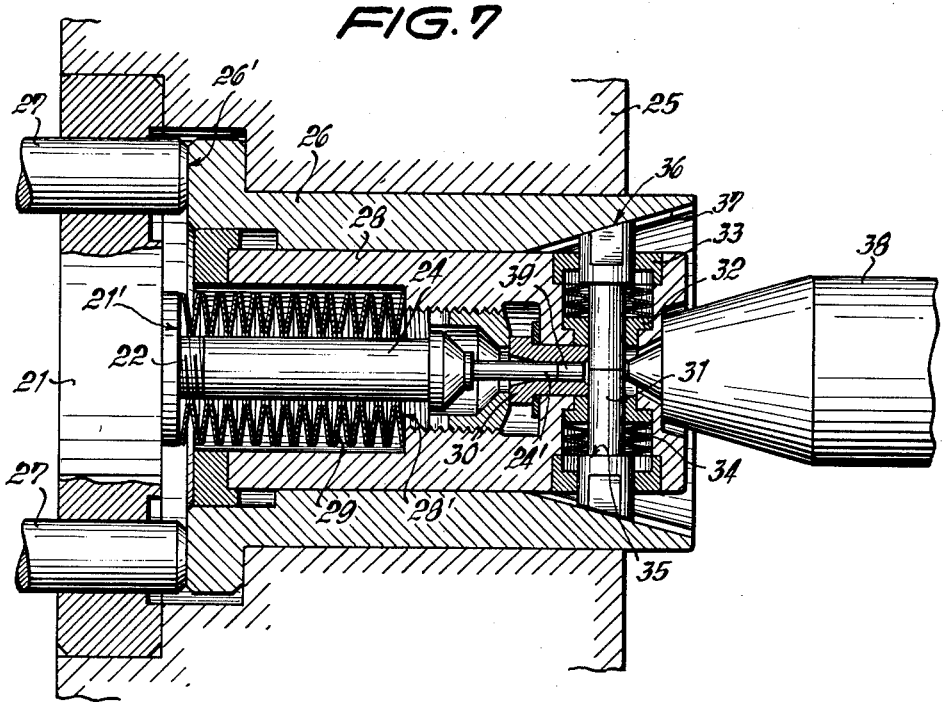
Figure 8:
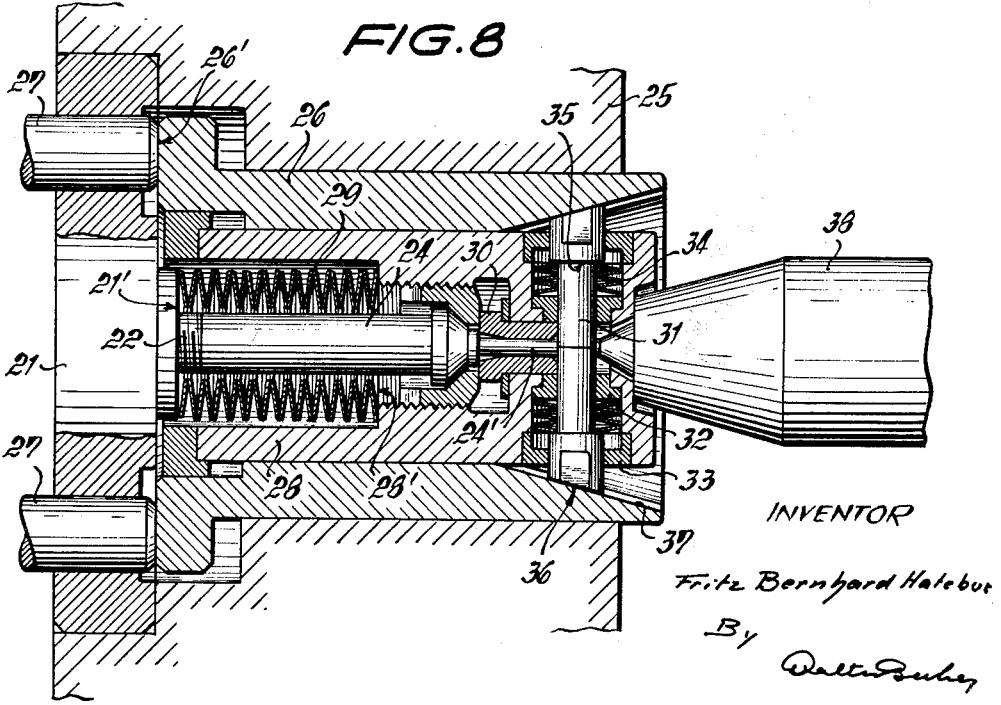

Further measures for performing the method are described in detail hereinafter with reference to devices according to the invention and which are given by way of example only. The figures show:

FIGS. 1–5 a device for hot forming fitting bushes in the various positions of the method, FIGS. 6–8 a device of similar construction for cold forming waisted bodies in the various positions of the method, FIGS. 9–11 the forming of a chaplet, and FIGS. 12–15 the processing of a cut length of bar into an axle body which receives its finished shape by the method according to the invention in a device for performing the same.

The devices described hereinafter in detail are intended for use in automatic cross transport presses in which, for example, three pressing tools are present, wherein the first presses a cut length of bar or length of wire into a cake which is then further formed in the second pressing tool by application of the method according to the invention, namely either into the finished piece or into an intermediate piece which is converted into the final shape in a third tool.

FIGURES 1–4 show at 1 a diagrammatically illustrated fixed part of the machine which carries the tool head from the die side. The same consists of an anvil body 2 which is secured to the part 1. A back ram 3 extends axially, is arrested in a specific position after an axial displacement to the left and forms a stationary back ram. It is retained and guided in a bushing 4 which is fastened in the anvil body 2. The anvil body 2 extends by its cylindrical body 5 in the axial direction in which a die support sleeve 6 is located. The latter is axially displaceable through the dimension $a$ (FIG. 1) in the cylindrical body 5 of the anvil body 2, namely to the left counter to the power of springs 7 which are arranged outside the cylindrical body 5 of the anvil body 2, or in axial recesses of the same. The springs 7 are supported by one of their ends against supporting faces 2' of the anvil body 2 and by their other ends against the supporting faces 6' of the die support sleeve 6.

A die support 8 is mounted axially displaceably inside the die support sleeve 6 and can be displaced to the left through the distance $b$ (FIG. 1), namely counter to the force of springs 9 which are supported by one of their ends on a supporting face 10 of the die support 8 and by their other ends against a supporting face 12 of an inwardly directed flange 11 of the die support 8 at the inner end thereof. Secured in the right-hand half of the die support 8 is a solidly closed die 13. In front of the solidly close die 13 there are located in the die support 8 at least two radially movable die jaws 14 with jaw inserts 15. The jaw inserts 15 exhibit internally the profile corresponding to the finished workpiece. The die jaws 14 are articulated by means of levers 16 to the front end of the die support sleeve 6.

FIGURES 1–5 show, on the press ram side, a press ram 17 which is axially displaceable, for example by means of a crankshaft. The press ram 17 embraces a stripper 18 which is displaceable to the left counter to spring power and in turn slides in a sleeve 19.

Figure 2:
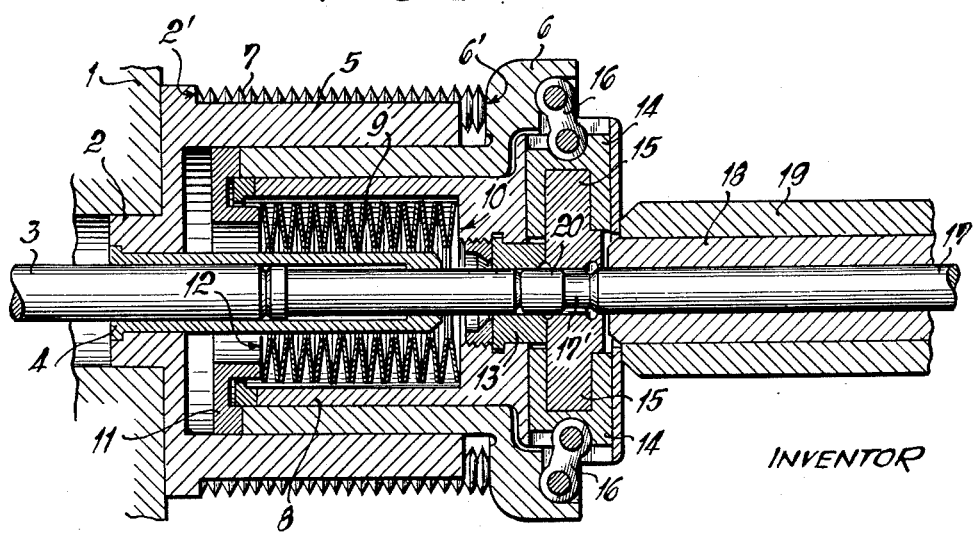
Figure 3:
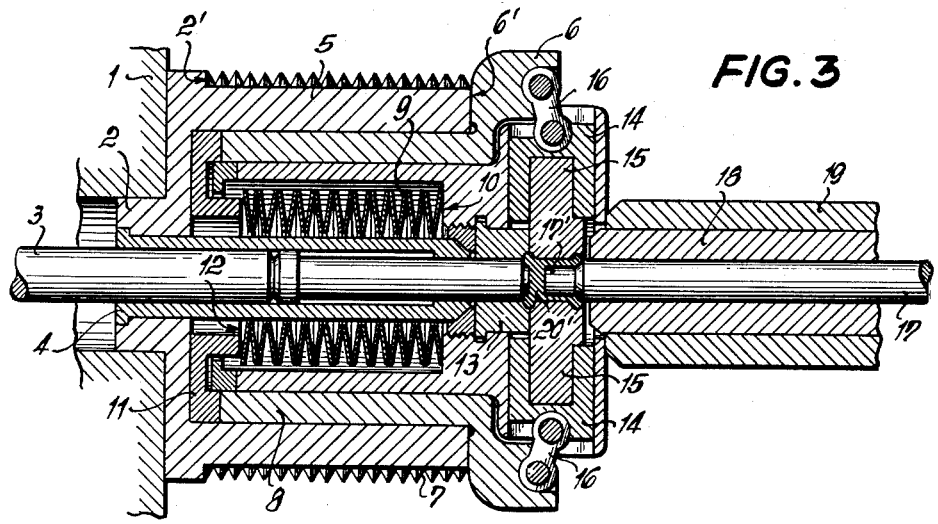

FIG. 1 shows the device at the instant when a length of bar preformed into a cake 20 in a preceding pressing tool has been brought between the end faces of the back ram 3 and of the press ram 17 and retained between the same. From this position, the cake 20 is transferred axially by displacement of the press ram 17 into the position according to FIG. 2. At the same time, the back ram 3 is displaced to the left into the fixed position. Simultaneously, the displacement of the press ram 17 together with the stripper 18 and the press ram sleeve 19 is associated with establishment of contact by the stripper 18 and the press ram sleeve 19 against the end face of the die support 8, producing displacement of the latter and of the cake 20 to the left. The displacement of the die support 8 occurs within the die support sleeve 6 through a fraction of the distance $b$ counter to the power of the springs 9, until due to the displacement the levers 16 tilt to the left, with which movement is associated a radial displacement of the die jaws 14 and of their jaw inserts 15 as far as the closed position which is illustrated in FIG. 2. The further displacement to the left of the press ram 17 with the stripper 18 and the press ram sleeve 19 now acts not solely upon the die support 8, but on the contrary, the latter, together with the die support sleeve 6, is displaced further to the left through the distance $a$ counter to the power of the springs 7, until the die support sleeve 6 rests against the anvil body 2. This displacement increases the power of the spring 9 and—simultaneously—the stronger spring power of the springs 7, which latter exert an increasing closing effort upon the jaw inserts 15. Since the back ram 3 is stationary during this displacement, the said movement results in the cake 20 being pressed into the finished shape 20', which is clearly shown in detail in FIG. 3. The front tip 17' of the press ram 17 penetrates into the cake 20 and causes the material to flow axially and radially in such a manner that it fills the entire remaining cavity between the back ram 3, the press ram 17 and the jaw inserts 15.

After the forming operation, the press ram sleeve 19 with the stripper 18 and press ram 17 is withdrawn as shown in FIG. 4. This is associated with the restoration of the die support sleeve 6 into the original position by the power of the springs 7. This movement is shared by the die support 8. When displacement to the right through the distance $a$ is complete, further displacement of the die support 8 to the right through the distance $b$ follows by virtue of the power of the springs 9. During the displacement to the right of the die support 8 alone, the levers 16 are pivoted once more into their original position. This pivoting of the levers 16 outwards causes the die jaws 14 with the jaw inserts 15 to open radially so that the finished piece 20' can be freely withdrawn mounted on the tip 17' of the press ram 17. After these displacements, a displacement of the back ram 3 to the right into the original position has also been effected.

FIG. 5 shows how the workpiece 20' is pushed off the tip 17' of the press ram 17 and released by the advance of the stripper 18 to the left from the position according to FIG. 4.

FIGURES 6-8 show, as a further exemplary embodiment, a device for manufacturing similar pressings.

A slightly different structure of the device has been chosen in order to illustrate simultaneously that the device may be elaborated in many different manners without changing its operating conditions.

FIGURES 6-8 show at 21 an anvil body to which a back ram 24 is secured in an axially immovable manner by means of a screwthread 22 and nut 23. The anvil body 21 is located within a fixed part 25 of a cross transport press which is indicated by a thick boundary line. Located likewise in the interior of the parts 25 of the machine is a die support sleeve 26 which is displaceable through the dimension $a$. It is supported by a face 26' against a piston 27, the displacement of which to the left is effected either counter to spring power or counter to pneumatic or hydraulic efforts. Also mounted in an axially displaceable manner in the interior of the die support sleeve 26 is a die support 28. The latter can be displaced through the distance $b$ to the left within the die support sleeve 26 counter to the power of springs 29. The springs 29 are supported by one of their ends against a supporting face 28' of the die support 28 and by their other ends against the supporting face 21' of the anvil body 21. The front end 24' of the back ram 24 is tapered and is partially or wholly surrounded by a solidly closed die 30 which is secured in the die support 28. Located in front of the solidly closed die 30 are at least two radially displaceable die jaws 31 which are retained and guided in the die body 28 by means of guide bushes 32 and 33. Against each of the bushes 32 there is supported a spring 34 which makes contact by its other end with a shoulder 35 of the die jaws. The effect of the springs 34 is that in order for the die jaws 31 to move inwards the power of the springs 34 must be overcome, so that the die jaws 31 move automatically radially outwards when the spring power alone operates freely. Outer faces 36 of the die jaws 31 are inclined, namely in such a manner that they make snug contact with an inclined inner face 37 of the die support sleeve 26. The end face of the die support 28 is adapted in shape to the press ram which is designated generally 38.

FIGURE 6 shows the device in the open position after the insertion of a blank 39, namely of a length of bar. According to FIG. 7, the press ram 38 moves to the left and in doing so makes contact against a portion of the end face of the die support 28 and displaces the die support 28 to the left. The springs 29 are thereupon compressed and displacement to the left through the distance $b$ occurs. During this displacement of the die support 28 in the die support sleeve 26, the die jaws 31—by their oblique faces 26—move along the inclined face 37 on the die support sleeve 26. This sliding movement produces a movement of the die jaws 31 radially inwards as far as the closed position (FIG. 7). The closed die jaws 31 and tip 40 of the press ram 38 now form the pressing mould, in front of which is positioned the blank 39 which—by the displacement of the die support 28 to the left—has come to rest against the end face of the stationary back ram 24. The further displacement of the ram 38 to the left causes further displacement of the die support sleeve 26 together with the die support 28 to the left through the distance $a$, namely counter to the power of the pistons 27 which counteracts the displacement. This last displacement is clarified by FIG. 8.

Now when the press ram 38 moves back to the right into the original position, the die support sleeve 26, together with the die support 28, first moves to the right through the distance $a$ by the force of the pistons 27. When this travel is complete, the springs 29 operate and displace the die support 28 alone to the right through the distance $b$, whereupon the die jaws 31 open radially by the force of the springs 34 and assume the position illustrated in FIG. 6. Upon further displacement of the press ram 38 to the right, the finished pressing can be run out axially from the open die jaws 31 on the spigot 40 of the press ram 38 and stripped off.

FIG. 9 shows a length of bar as an initial blank for manufacturing a chaplet. Workpiece 41 is first shortened and provided with a headpiece 42 in a first pressing tool and is then inserted into the device according to FIG. 11 in the open position. The device according to FIG. 11 corresponds in construction to that according to FIGS. 6-8, so that reiterated description of the details may be dispensed with. However, attention should be paid to the conformation of press ram 43 which is provided with a hole 44 in which there is axially displaceable a press rod whereby the position of end face 45 can be locked. Another feature worthy of note is the profiling of end face 46 of stripper 47, whereby a second solidly closed die is achieved, forming a part of the press ram 43. The blank having the headpiece 42 is therefore formed within a solidly closed die 30 corresponding to the FIGURES 6-8 and radially displaceable die jaws 31 and a further solidly closed die to form the chaplet 41' as illustrated in FIG. 11, which shows a device for manufacturing chaplets in the position of the press according to FIG. 8.

FIG. 12 again shows a length of bar which is designated 48. The length of bar 48 is shaped in a first pressing tool into blank 49 which is provided with a head 50. The said blank 49 is formed in a device similar to that according to FIG. 11—i.e., in a device wherein the press ram forms a second solidly closed die—into the finished piece according to FIGURES 14 and 15, which apart from the tapered shank end 51 exhibits a flatted portion 52 and a longitudinal groove 53, while the latter portions 52 and 53 are generated by means of the radially displaceable die jaws. The die jaws correspond—except for their inner profiling—to the die jaws which are designated 31 in FIGS. 6-8 and 11.

As already mentioned, the device according to the invention may be applied to both hot forming and cold forming workpieces. The primary idea underlying the construction of the devices described, which are capable of considerable structural variations, is their use in cross transport presses in which a plurality of forming stages are combined. Since the forming of the workpieces is carried out with the aid of axial movements of the press ram and of the dies, axial drive movements are present such as are also provided in the case of the preceding or succeeding tools for preforming and afterforming in the case of cross transport presses. The result of this is that the device according to the invention admits of fully automatic operation, while obviously the transport tools customary in the case of cross transport presses are applied in order to feed the blank to the device and to move it on after forming to the next process.

What I claim is:

1. A device for forming work pieces comprising; a back ram, a die support movably supported with respect to said back ram, a solidly closed first die in said die support, a second die in said die support adjacent said first die, said second die comprising radially movable die jaws, and a press ram aligned with said back ram and movable toward and away from said back ram for cooperation therewith to form work pieces in said dies.

2. A device for forming work pieces comprising; a back ram, a die support movably supported with respect to said back ram, a solidly closed first die in said die support, a second die in said die support adjacent said first die, said second die comprising radially movable die jaws, and a press ram aligned with said back ram and movable toward and away from said back ram for cooperation therewith to form work pieces in said dies, said die support surrounding said back ram and being resiliently biased toward said press ram, said dies being supported in said die support co-axially with said rams.

3. A device for forming work pieces comprising; a back ram, a support sleeve co-axial with said back ram and resiliently urged in one direction axially of said back ram, a die support reciprocably in said sleeve and resiliently biased therein in the said one direction, a closed first die in said die support, a second die in said die support adjacent said first die and comprising radially movable die jaws, a press ram aligned with said back ram and spaced therefrom in the said one direction, said press ram being movable toward said back ram, and means operated by said press ram for moving said die support and said support sleeve in a direction opposite to said one direction.

4. A device for forming work pieces comprising; a back ram, a support sleeve co-axial with said back ram and resiliently urged in one direction axially of said back ram, a die support reciprocably in said sleeve and resiliently biased therein in the said one direction, a closed first die in said die support, a second die in said die support adjacent said first die and comprising radially movable die jaws, a press ram aligned with said back ram and spaced therefrom in the said one direction, said press ram being movable toward said back ram, and means operated by said press ram for moving said die support and said support sleeve in a direction opposite to said one direction, the said movement of said die support in the direction opposite to said one direction being operable for moving said die jaws toward each other while movement thereof in the said one direction will bring about movement of said die jaws away from each other.

5. A device for forming work pieces comprising; a back ram, a support sleeve co-axial with said back ram and resiliently urged in one direction axially of said back ram, a die support reciprocably in said sleeve and resiliently biased therein in the said one direction, a closed first die in said die support, a second die in said die support adjacent said first die and comprising radially movable die jaws, a press ram aligned with said back ram and spaced therefrom in the said one direction, said press ram being movable toward said back ram, and means operated by said press ram for moving said die support and said support sleeve in a direction opposite to said one direction, the said movement of said die support in the direction opposite to said one direction being operable for moving said die jaws toward each other while movement thereof in the said one direction will bring about movement of said die jaws away from each other, the resilient bias exerted on said sleeve being greater than the resilient bias being exerted on said die support whereby the die support first moves relative to the support sleeve and thereafter the die support and sleeve move in unison.

6. A device for forming work pieces comprising; an anvil body, a back ram, a die support sleeve reciprocable in said anvil body and co-axial with said back ram, yieldable means interposed between said anvil body and said support sleeve to resist movement of the sleeve toward the body, a die support reciprocably mounted in said sleeve and yieldable means between the die support and the sleeve urging the support in said one direction in the sleeve, a first closed die in said die support, a second die in said die support adjacent said first die and comprises radially movable jaws, press ram co-axial with said back ram and spaced therefrom in said one direction, a sleeve surrounding said press ram, said press ram being movable toward said back ram for carrying a work piece therebetween into said die, said sleeve being engageable with said die support for moving the die support toward said support sleeve and then moving said die support and support sleeve together toward said body, and means connecting said jaws with said support sleeve operable in response to movement of the die support toward the support sleeve for closing said jaws, said press ram comprising a punch portion on the end thereof arranged to penetrate the work piece being formed and to withdraw the work piece from the dies upon retraction of the press ram, and stripper means associated with the press ram operable for stripping a complete work piece from said punch portion.

7. A device for forming work pieces according to claim 6 in which the means connecting the die jaws to said support sleeve comprise links pivoted at their one ends to the support sleeve and at their other ends to said die jaws.

8. A device for forming work pieces according to claim 6 in which the last mentioned means comprise inclined surfaces on the support sleeve and end portions on the die jaws engage said inclined surfaces.

9. A device for forming work pieces according to claim 8 in which spring means are provided urging said die jaws outwardly.

10. A device for forming work pieces according to claim 6 in which the means for moving said die jaws radially is operable for moving the individual jaws sequentially.

11. A device for forming work pieces according to claim 6 in which said back ram is fixedly supported relative to said anvil body.

12. A device for forming work pieces according to claim 6 in which said back ram is reciprocably mounted relative to said anvil body.

References Cited in the file of this patent
UNITED STATES PATENTS

| | | |
|---|---|---|
| 438,498 | Smith | Oct. 14, 1890 |
| 1,027,383 | Glover | May 21, 1912 |
| 1,977,164 | Wilcox | Oct. 16, 1934 |
| 2,978,932 | Frueauff | Apr. 11, 1961 |

FOREIGN PATENTS

| | | |
|---|---|---|
| 381,718 | Germany | Sept. 24, 1923 |